United States Patent [19]

Allen et al.

[11] Patent Number: 5,102,263
[45] Date of Patent: Apr. 7, 1992

[54] METHOD OF RENOVATING AND/OR PROTECTING SEWERS AND PIPES

[75] Inventors: Peter Allen, Cleveland; Sydney Molyneux, MacGregor, both of Australia

[73] Assignee: Danby of North America, Inc., Columbia, Md.

[21] Appl. No.: 392,959
[22] PCT Filed: Feb. 1, 1988
[86] PCT No.: PCT/AU88/00027
§ 371 Date: Jul. 18, 1989
§ 102(e) Date: Jul. 18, 1989
[87] PCT Pub. No.: WO88/05884
PCT Pub. Date: Aug. 11, 1988

[30] Foreign Application Priority Data

Jan. 30, 1987 [AU] Australia .................. PI0111

[51] Int. Cl.⁵ .................................. E21D 11/00
[52] U.S. Cl. .................. 405/153; 405/151; 138/97
[58] Field of Search .......... 138/97, 98; 405/132, 405/135, 150-154

[56] References Cited

U.S. PATENT DOCUMENTS

| | | | |
|---|---|---|---|
| 3,169,376 | 2/1965 | Cunningham | 405/150 |
| 3,393,523 | 7/1968 | Krivda | 405/151 |
| 3,438,211 | 4/1969 | Zywietz | 405/152 |
| 4,347,018 | 8/1982 | Wrightson et al. | 405/150 |
| 4,585,371 | 4/1986 | Jones-Hinton | 405/153 |
| 4,610,120 | 9/1986 | Canavesi et al. | 405/150 X |
| 4,733,629 | 3/1988 | Hunt et al. | 138/154 X |

FOREIGN PATENT DOCUMENTS

| | | |
|---|---|---|
| 1834983 | 3/1984 | Australia . |
| 0024157 | 2/1981 | European Pat. Off. . |
| 1914174 | 10/1970 | Fed. Rep. of Germany ...... 405/151 |
| 2027149 | 12/1971 | Fed. Rep. of Germany . |
| 503080 | 12/1954 | Italy ................... 405/151 |
| 954595 | 4/1964 | United Kingdom ................ 405/152 |
| 1010889 | 11/1965 | United Kingdom . |
| 1381292 | 1/1975 | United Kingdom . |
| 2087456 | 5/1982 | United Kingdom . |

Primary Examiner—Randolph A. Reese
Assistant Examiner—John Ricci
Attorney, Agent, or Firm—Oblon, Spivak, McClelland, Maier & Neustadt

[57] ABSTRACT

A liner for large diameter pipes is formed from lengths of PVC panels (10) which are cut to length and placed around the wall of the pipe, the ends (19) of the panels being butt-joined by joining strips (20). Each panel (10) has a formation along one side complementary with a formation along the other side so that adjacent panels (10) can be clipped together to form a liner extending from manhole to manhole along the pipe.

4 Claims, 3 Drawing Sheets

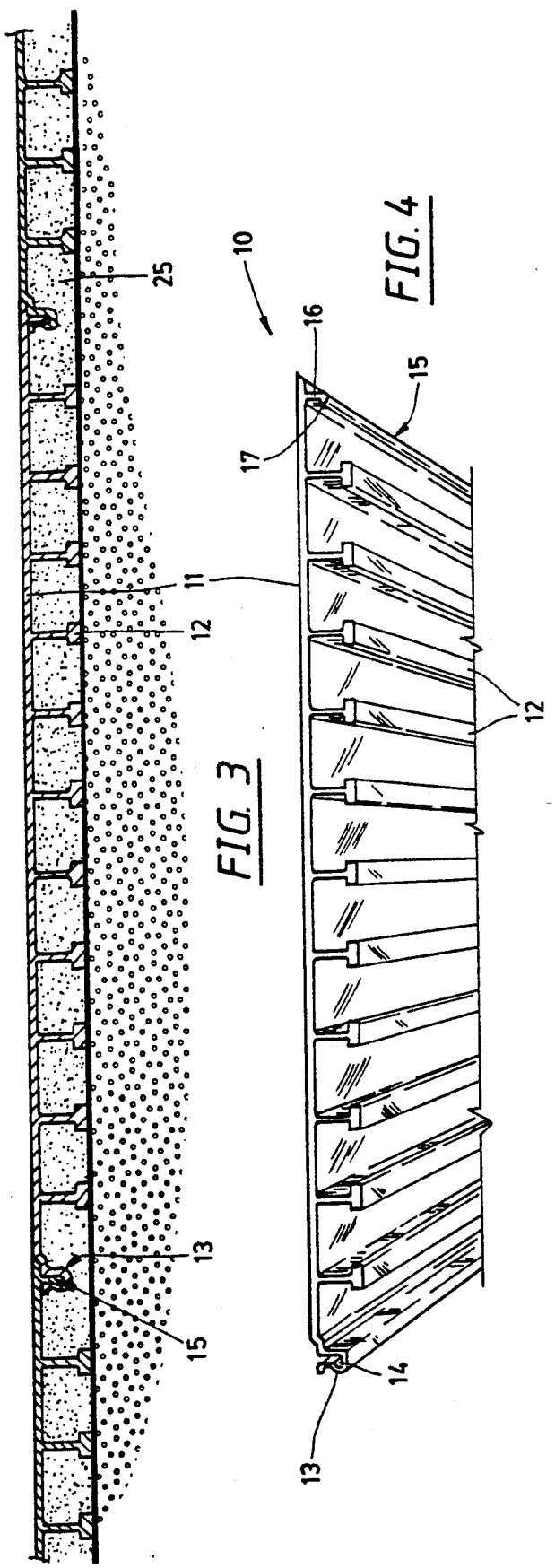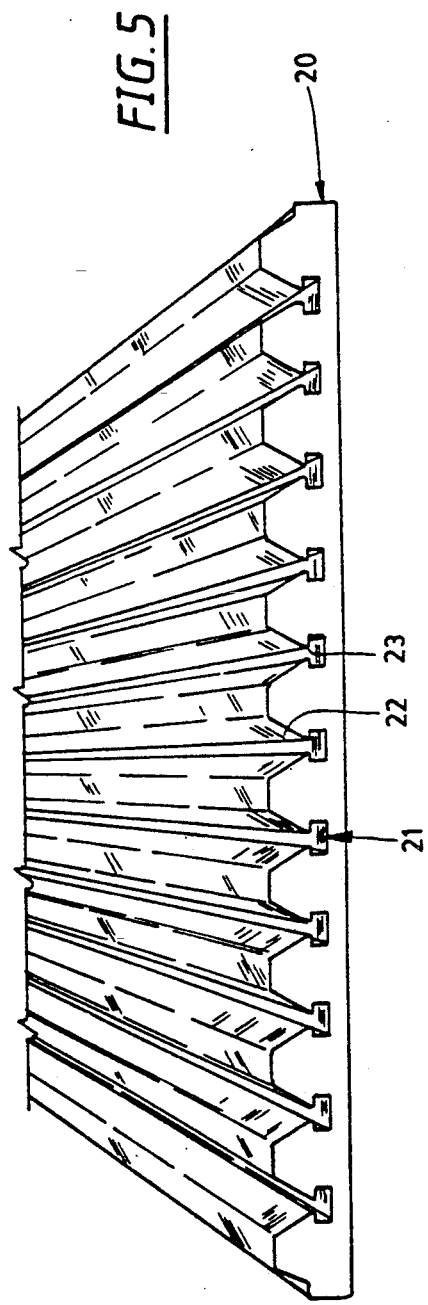

METHOD OF RENOVATING AND/OR PROTECTING SEWERS AND PIPES

BACKGROUND OF THE INVENTION

(1) Field of the Invention

This invention relates to a method of fixing plastic panels inside large diameter sewers or pipes to renovate and/or protect the pipes from corrosion and or erosion. The invention is particularly suitable for, but not limited to, man-entry, circular and oviform sewers.

(2) Prior Art

Current methods of man-entry sewer restoration include the use of segments of preformed liner (usually of fibreglass) which are winched into place. These methods generally require some excavation and result in significant loss in cross-sectional area. Other methods use a fibre reinforced resin bag wich is blown up within the pipe. However, these are expensive and the diameter of pipes to which they can be applied is limited.

SUMMARY OF THE PRESENT INVENTION

It is an object of the present invention to provide a method of lining sewers or pipes using panels which can be easily handled and installed without excavation.

It is a preferred object to provide a method where the panels have gas tight joints.

It is a further preferred object to provide a method where the panels are placed against the existing pipe wall and result in a smooth surface with improved hydraulic performance.

It is a still further preferred object to provide a method where the grout can be easily and accurately placed between the liner and the pipe wall.

It is a still further preferred object to provide a method which is relatively inexpensive.

Other preferred objects of the present invention will become apparent from the following description.

In a broad aspect, the present invention resides in a method of lining sewers or pipes including the steps of:

curving panels around the wall of the sewer or pipe, each panel having a formation along one side edge complementary with a joint formation along the adjacent other side of a second similar panel;

circumferentially butt-joining the panels together to form a liner using the respective formations on the adjacent panels; and joining the free ends of the panels together with one or more joining strips.

If required, grout may be inserted into the space between the panels and the wall to secure the liner in position.

Preferably each panel has a substantially planar body with a plurality of outwardly directed formations e.g. of y or T section on the outer face of the body. The formations space the body from the pipe wall and may key the liner to the grout.

Preferably each panel has a first joint formation along one side of substantially inwardly directed U-section, which is engageable by a second joint formation along the other side of an adjacent similar panel.

Preferably the second joint formation has an outwardly directed leg engageable in the U-section of the first joint formation.

Preferably the free ends of the panels are joined by female joining strips. Preferably the female joining strip is applied within the cavity between the liner and the wall before any grout is injected into the cavity.

BRIEF DESCRIPTION OF THE DRAWINGS

To enable the invention to be fully understood, a preferred embodiment will now be described with reference to the accompanying drawings, in which:

FIG. 3 is a sectional end view, taken on line 3—3 on FIG. 1, showing the liner which has been grouted; and FIGS. 4 and 5 are respective perspective views of the liner panel and joining strips.

DETAILED DESCRIPTION OF THE PREFERRED EMBODIMENT

Referring to FIG. 4, each panel 10 is extruded of unplasticized PVC (uPVC) and has a planar body 11 with a smooth inner face. A plurality of T-shaped formations 12 are formed integrally with the panel on the outer side of the body. The formations 12 reinforce the body when the panels are curved, space the body 11 from the sewer wall and key the liner to the grout in the cavity between the sewer wall and the liner.

Figure 2:
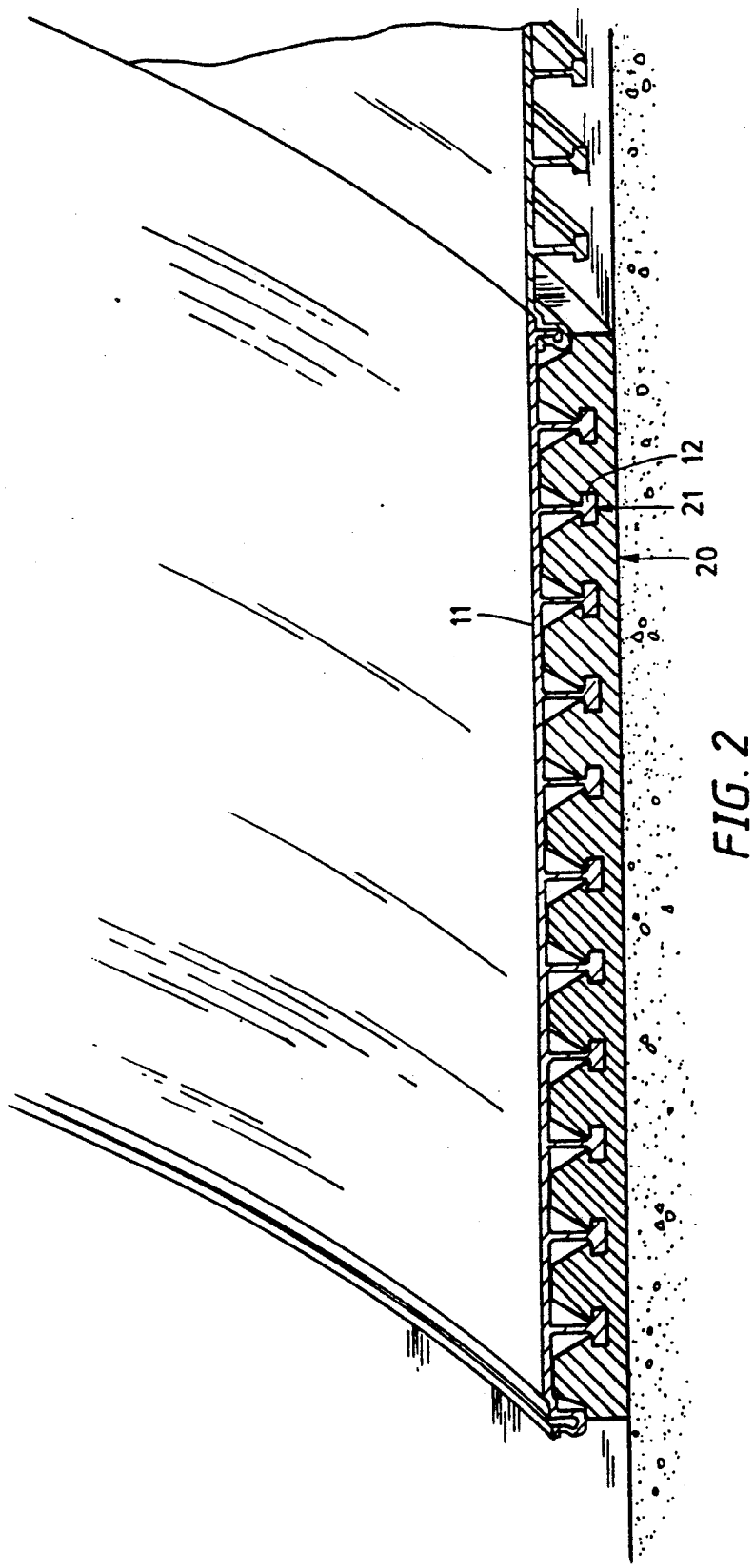
FIG. 2 is a sectional end view, taken on line 2—2 on FIG. 1, showing a liner panel engaged with a joining strip.

A first joint formation 13 (see FIG. 2) is provided along one side of each panel. The formation 13 is inwardly directed and is of substantially U-shape with longitudinal recess 14.

A second joint formation 15 is provided along the other side of each panel 10. This formation has an outwardly directed leg 16 engageable in the mouth of the first joint formation 13 and has a distal bead 17 which engages the recess 14.

As shown in FIG. 3, the adjacent sides of the panels 10 are secured together by the complementary first and second joint formations 13, 15.

In use the panels 10 are factory cut to length to suit the circumference of the sewer to be lined.

The panels 10 are passed down a manhole into the pipe and are curved around the wall of the pipe (see FIG. 1)). The panels 10 are butted together, the first and second joint formations 13, 15 of adjacent panels being clipped together to form a liner extending from manhole to manhole.

Figure 1:
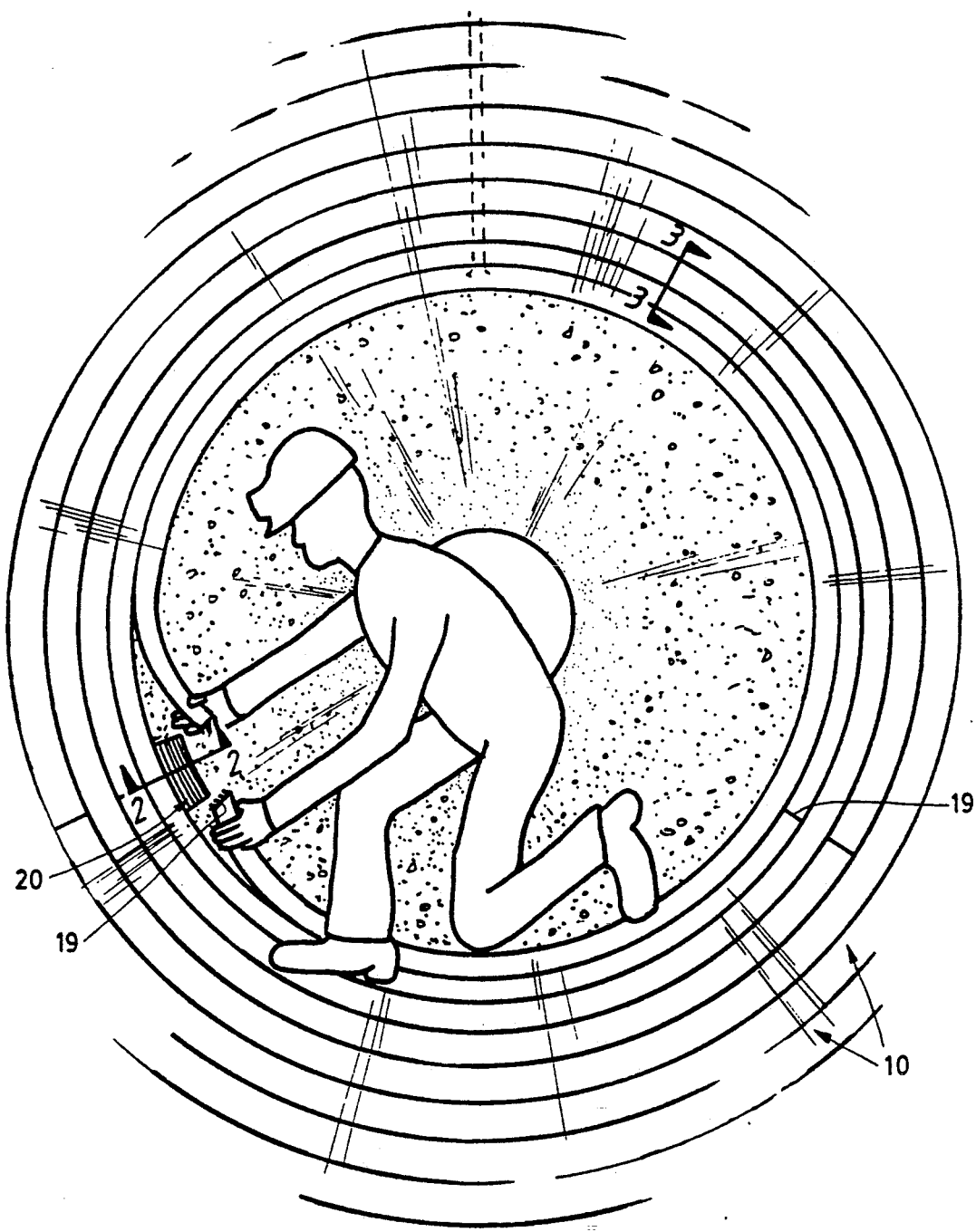
FIG. 1 is an end view showing the liner being installed in a pipe.

When each panel 10 is installed, its ends 19 are butted together and are joined by a female joining strip (see FIGS. 1 and 5). As shown in FIG. 1, the butt-joints of adjacent panels 10 are offset.

The female joining strip (FIG. 5) is also formed of extruded PVC and has a plurality of longitudinal recesses 21 to receive respective areas of the formations 12. Each recess 21 has downwardly convergent upper side walls 22 and locking abutments 23.

Generally the liner, which has its formations 12 bearing against the pipe wall, does not require grouting. However, hydrogen sulphide gas in the sewer may have eaten away areas of the upper portion of the pipe wall. If this has occurred, holes may be drilled through the pipe wall and grout 25 pumped into the cavity between the liner and the pipe wall.

When the grout sets, the liner is securely locked in place in the sewer. As the liner is placed against the wall, spaced by the formations 12, 15, little cross-sectional area is lost and the smooth inner surface of the liner provides good hydraulic performance.

The embodiment described and illustrated is by way of an example only and various changes and modifications may be made thereto without departing from the scope of the present invention defined in the appended claims.

We claim:

1. A method of lining sewers or pipes including the steps of:

curving panels around the wall of the sewer or pipe, each panel having a first joint formation along one side edge complementary and interlocking with a second joint formation along the adjacent other side of a second similar panel;

circumferentially butt-joining and interlocking the panels together to form a liner using the respective first and second joint formations on the adjacent panels;

butt-joining the free ends of the panels together with one or more female joining strips;

spacing the butt-joined ends of adjacent panels around the liner; and applying said female joining strip completely in a cavity between the liner and the wall with said female joining strip having a plurality of longitudinal recesses each arranged to receive and secure a respective outwardly directed formation on respective panels such that said liner provides a smooth inner surface with improved hydraulic performance.

2. A method according to claim 1, wherein:

the first joint formation along one side of each panel is of inwardly directed substantially U-formation engageable by a second joint formation along the other side of an adjacent similar panel.

3. A method according to claim 2, wherein:

the second joint formation has an outwardly directed leg engageable in the U-section of the first joint formation.

4. A method according to claim 1, wherein:

after the liner is installed grout is injected into the cavity between the pipe wall and the liner and is allowed to set, the outwardly directed formation on the liner keeping the liner to the pipe wall.

* * * * *